(12) United States Patent
Messer et al.

(10) Patent No.: US 6,286,393 B1
(45) Date of Patent: Sep. 11, 2001

(54) INSULATION DEVICE

(75) Inventors: Jürg Messer, Oberdorf; Beat Locher; Martin Strehl, both of Thun, all of (CH)

(73) Assignee: Schleuniger Holding AG (DE)

( * ) Notice: Subject to any disclaimer, the term of this patent is extended or adjusted under 35 U.S.C. 154(b) by 0 days.

(21) Appl. No.: 09/403,194

(22) PCT Filed: Apr. 7, 1998

(86) PCT No.: PCT/IB98/00505

§ 371 Date: Oct. 14, 1999

§ 102(e) Date: Oct. 14, 1999

(87) PCT Pub. No.: WO98/47209

PCT Pub. Date: Oct. 22, 1998

(30) Foreign Application Priority Data

Apr. 14, 1997 (CH) .................................. 0863/97

(51) Int. Cl.[7] .................................................. H02G 1/12
(52) U.S. Cl. ........................................ 81/9.51; 81/9.41
(58) Field of Search .............................................. 81/9.51

(56) References Cited

U.S. PATENT DOCUMENTS

| 4,584,912 | * | 4/1986 | Gudmestad et al. |
|---|---|---|---|
| 4,713,880 | * | 12/1987 | Dusel et al. ........................ 29/564.4 |
| 4,916,811 | * | 4/1990 | Uehara et al. ........................ 29/863 |
| 5,522,130 | * | 6/1996 | Wollermann . |
| 5,950,505 | * | 9/1999 | Locher ................................. 81/9.51 |

* cited by examiner

Primary Examiner—Derris H. Banks
Assistant Examiner—David B. Thomas

(57) ABSTRACT

The invention relates to a method and a device for stripping a cable end section (13), comprising a novel measuring system in which the length of the inserted cable end section is determined during the insertion itself.

21 Claims, 8 Drawing Sheets

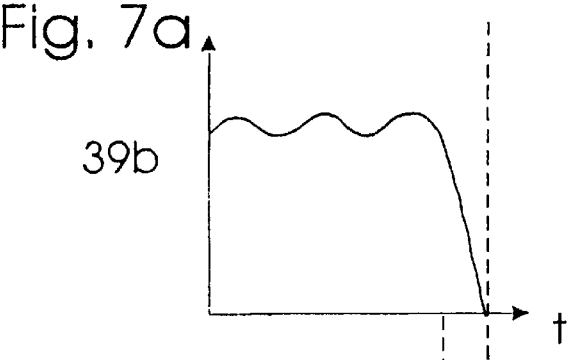
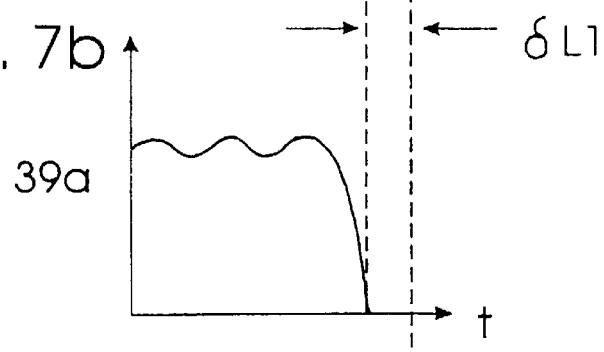
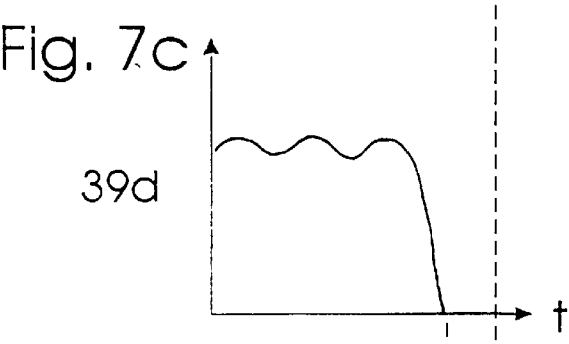
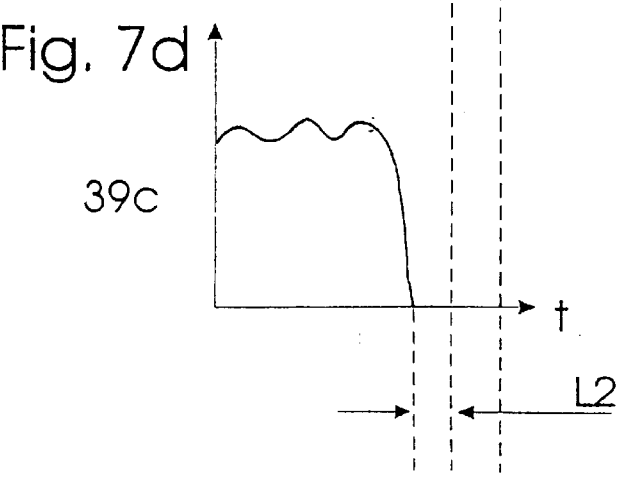

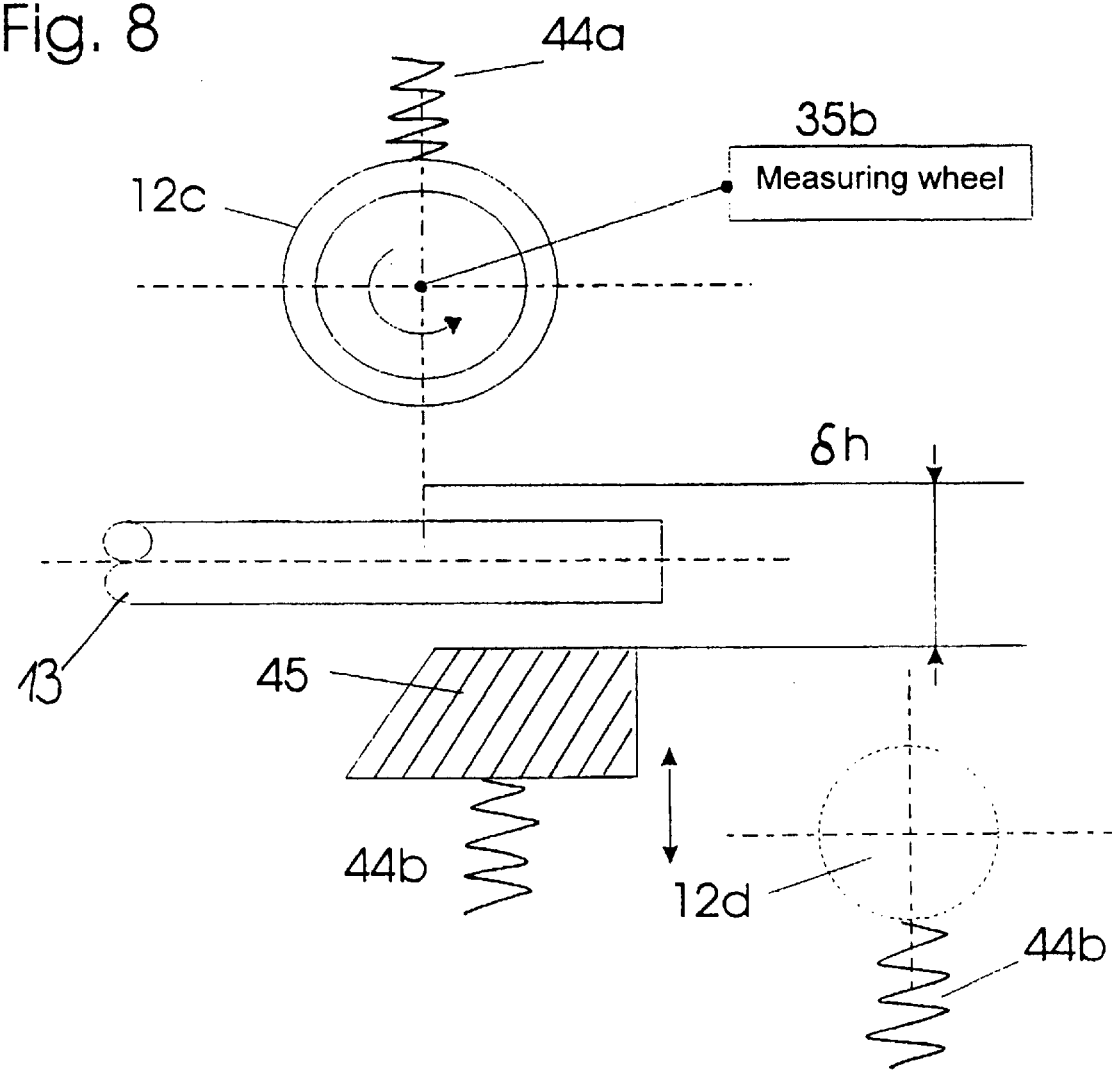

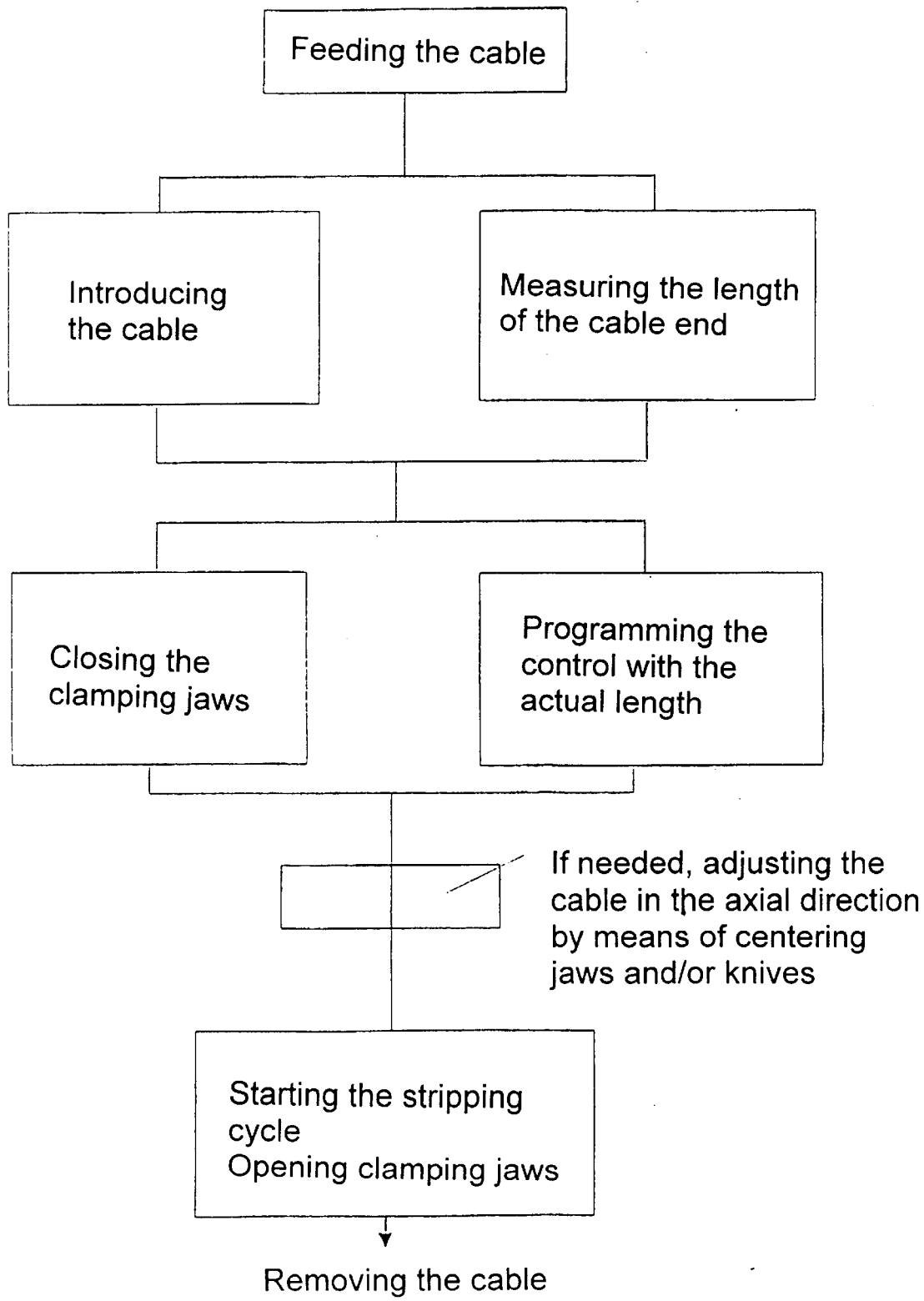

INSULATION DEVICE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a method and a device for stripping cable and wire end sections, in particular electrical or fiberoptic cables having a coaxial structure.

2. Discussion of Relevant Art

Such methods and devices have long been known. EP-B-195932 describes a type of stripping device frequently used world-wide. This structure comprises—in contrast to stripping devices for stripping continuous cables—essentially clamping jaws, centering jaws, knife jaws and a stop for the manually fed cable end section which is to be cut into and stripped—in particular in a plurality of stages. The stop performs the function of a length adjustment for the cable end section and the function of detecting that the cable end section has passed through the pre-set length and thus rests with its end against the stop, a specific distance from the clamping jaws. The stop is accordingly connected to a stop sensor.

In a further development of this structure, the stop sensor was dispensed with and instead a step was offered in which the knives or centering jaws were closed in a predetermined axial position before the insertion of the cable end section, and the cable end section could thus abut the closed knife jaws or centering jaws. Since the knife jaws or centering jaws were moved beforehand to the corresponding longitudinal position, comparably to the stop according to the EP-B, the knives and centering jaws thus fully performed the length adjusting function for the cable end section. In these two known methods and devices, no length measurement was carried out but an active pre-setting of the length with the aid of a stop or with the aid of the centering and/or knife jaws acting as a stop.

Another structure for processing continuous cables is disclosed in U.S. Pat. No. 5,522,130. A combination of light barriers and controlled drive (measuring) wheels permits positioning of the cable length relative to stationary knives.

Another method for determining the length of cable end sections or another device is described in EP-A-673099. In the case of this structure, the cable end section to be processed is introduced into the stripping device and is held there in its current axial position, which is not exactly predetermined. The actual length is then scanned by means of a scanning arrangement which is displaceable—in the longitudinal direction of this cable end section and relative to said end section—toward the free end thereof and is formed by the closed centering jaws sliding on the cable surface, and the length of the clamped cable end section is thus measured.

Whereas in the first method a length adjustment but no true length measurement is performed, in the second method a length measurement is carried out on the randomly inserted cable end section fixed in the axial position.

Both known methods have characteristics in need of improvement. The method first described is difficult to use in the case of relatively soft cable end sections. Although the method described secondly attempts to overcome this disadvantage, it is difficult to use precisely in the case of soft and thin cables. In particular, soft insulations on cable can be displaced axially relative to the conductor so that the measurement may be erroneous.

Moreover, the additional step of the length measurement in the second method delays the stripping process in comparison with the method first described.

Although a further development of the second method by the Applicant (CH-2053/96, not yet published, and WO-98/08283) improved the measuring problem in the case of soft cables having soft cable sheaths, it did not lead to accelerated stripping compared with the first method.

SUMMARY OF THE INVENTION

It is thus the object of the invention to provide a novel method and an improved device, in which thin and relatively soft cable end sections, too, can be determined with respect to length without additional loss of time.

This object of the present invention is achieved for the first time by a completely novel measurement philosophy: the length of the cable end section is neither to be actively determined by pre-setting nor to be measured after axial clamping, but, according to the invention, during the insertion into the stripping device. This novel measuring concept according to the invention has surprising advantages compared with the known one:

The time required for the length measurement is reduced virtually to zero since the measurement is performed simultaneously with the insertion of the cable. The consistency of the cable therefore does not in principle play a major role since, with appropriate design of the measuring means, a soft or curved cable, too, can be sufficiently accurately measured. The length measurement in the context of the invention relates to measuring processes with a continuously acting—in particular non-contact—measuring device which also comprises incremental or digital or stepped methods of measurement. In the simplified extreme case, the method of measurement may even comprise measurement by means of the operator's eye, for example along a built-in ruler or along a ruler printed on the cables.

In principle, the device according to the invention serves for stripping conventional cables, which however may optionally also be pre-treated. Thus, for example, it is possible to apply markings compatible with the length measurement on the surface of a cable or to print on other information which supports a measuring process—in particular an optical one.

A clamping means in the context of the invention is a device which holds the inserted cable in a specific axial position. If required, it can itself also be displaceable relative to the frame of the stripping device. Clamping means are not limited to clamping jaws alone. They might also have rotatable clamping rollers or the like. Clamping rollers in the widest sense are also not limited to individual rollers; a plurality of rollers or rollers having conveyor belts or the like might also be used. Finally, it is known that a movement of the knife device relative to the clamping means is important for stripping. The present invention comprises all possibilities for the production of such a relative movement, but expressly not continuous feeding of a continuous cable in a continuous-cable processing machine having drive rollers or drive belts, as, for example, the "Powerstrip 9500" structure of the Applicant.

The object is achieved by the features of the independent patent claims and by the independent clauses of claims 1, 2 and 7. Preferred embodiments and further developments and variants of the method according to the invention and of the device according to the invention are described and protected in the claims dependent thereon.

Regarding the achievement of the above-mentioned object, claim 1 goes even further in that it additionally protects stripping devices in which, not only—or instead of—the length of the inserted cable, other dimensions are measured virtually without contact. According to the invention, these may be, for example, thickness or type information which is applied to the cable either in code form and is virtually only read, or which is genuinely measured by measuring means. Industry is familiar with a very wide range of measuring devices which could be used for this purpose, for example parallel-light projectors with optical scanning, video cameras with computational image evaluation, etc.

BRIEF DESCRIPTION OF THE DRAWINGS

The invention is described in more detail—in particular for the length measurement—on the basis of various exemplary embodiments. Some of these embodiments are shown as diagrams in Figures:

FIG. 7a–7d show schematic measuring diagrams for a device according to FIG. 7;

FIG. 8 shows a variant of a measuring device which dispenses with optical sensors and FIG. 9 shows a diagram illustrating the principle of the novel stripping device with length measurement.

The Figures are described in relation to one another. Identical reference symbols denote identical components, and identical reference symbols with different indices denote components having a similar function. There is no need to discuss in more detail the fundamental mechanical structures of the various stripping devices shown by way of example, since these are known to a person skilled in the art and are disclosed by way of example, for example in EP-B-195932, but also, for example, by the types 2015, 2500, 207, 8015 of the Applicant.

Figure 1:
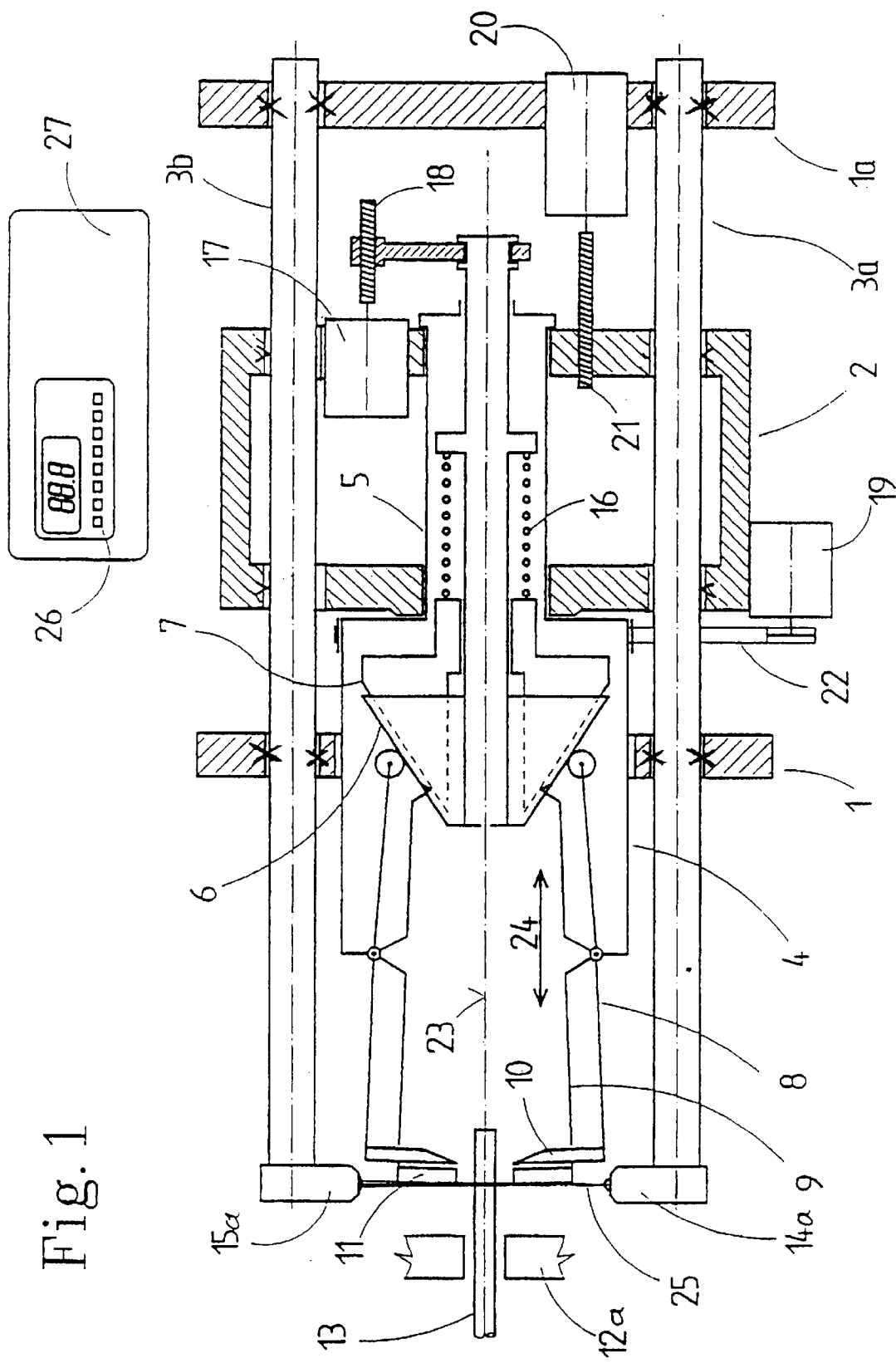
FIG. 1 shows a structure according to WO98/08283 mentioned, but with rigid guide rods.
Figure 2:
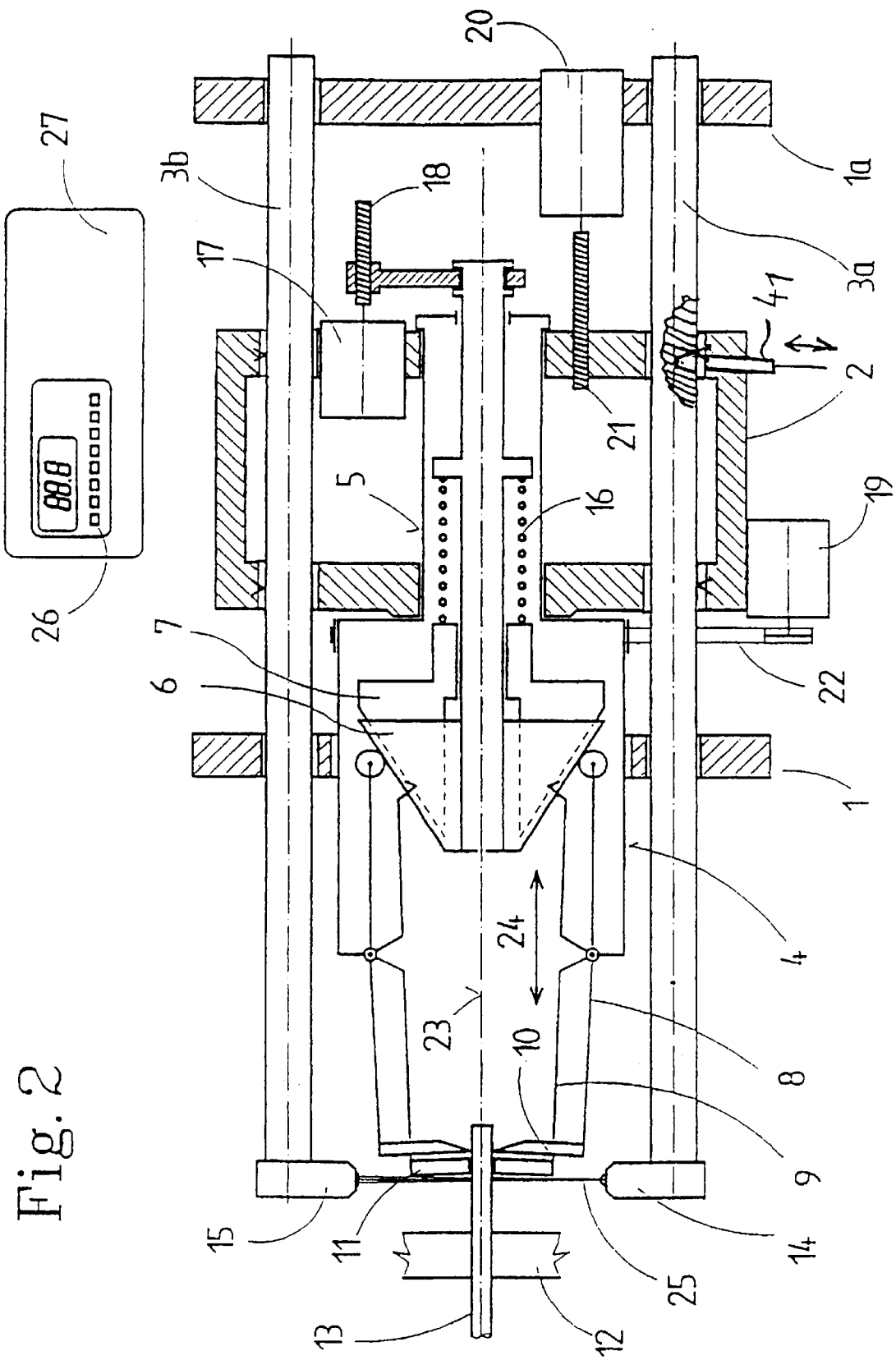
FIG. 2 shows a variant thereof having couplable guide rods.

The present invention especially relates to structures corresponding to WO98/08283 with its priority date of Aug. 21, 1996. The structures mentioned there, in particular the structures according to FIGS. 1 and 2, are considered to be disclosed in the context of the present Application. The details mentioned there with respect to the arrangement of an optical sensor for the optical detection of a length measurement could be combined with the present invention according to the structure in FIG. 2. The axial mobility of the optical sensor, envisaged in said WO Patent Application, is of course not essential for the present invention but optionally can nevertheless be provided. Mixed operation or the implementation of different types of measurements in succession is also possible within the scope of the invention. The fact that the present invention is by no means limited to rotating stripping knives but can be used with any kind of stripping devices in which cable end sections are pushed behind or under or through opened clamping jaws in order subsequently to be clamped—optionally further displaced—and processed is of importance. This also gives rise to the essential difference compared with conventional continuous stripping devices in which cables are unrolled from a continuous cable drum and are fed by means of conveyor rollers or conveyor belts continuously to a processing station. Owing to the completely different method of cable feeding, the measurement techniques used there for the length measurement are based on completely different preconditions and, up to the date of the present invention, were obviously never intended also to be used for the present category of stripping machines.

FIGS. 1 and 2 correspond to a structure according to WO98/08283 mentioned but have the following modifications compared with the structure shown there: instead of displaceable guide rods 3, these guide rods according to FIG. 1 are rigidly connected to the frame 1 of the stripping device. At their end on the cable side, they carry an optical sensor 14 or 15a, one being in the form of a transmitter and the other in the form of a receiver. The sensors 14a, 15a known per se—and realizable by various optical measures—are thus in a fixed location relative to the clamping device 12a and the frame 1. The cable end 13 pushed through the clamping device 12a is measured in its length by the optical sensors which are coupled to a corresponding electronic control 27 having a corresponding evaluation circuit. The process of the knives 10 and the centering jaws 11 sliding along on the cable sheath 13—as is known from the second method according to the prior art of the EP-A mentioned—can thus be omitted in the present invention. This distinguishes it in principle from the structure of the WO98/08283 Application mentioned.

However, combinations with methods of measurement corresponding to the WO98/08283 Application mentioned are also entirely within the scope of the present invention. Such combinations can be realized if the guide rods 3 can be fixed optionally in a carriage 2 by a coupling 41 or are detachable from said carriage, as shown by way of example in FIG. 2. In the fixed state, the sensors 14a and 15a served, as described in WO98/08283, merely as end sensors, whereas the actual measurement is carried out on the encoded motor 20 for the longitudinal feed of the carriage. In the released state (as shown in FIG. 2), the sensors 14a and 14b are however in the direct measuring mode, as shown in FIG. 1, i.e. the electronics in the electronic control 27 measures, on the basis of the signals of the receiver sensor 14, the current length of the inserted cable end section continuously during insertion. The coupling 41 may be of different forms. It may be in the form of magnetic clamps or simple catches which can be manually operated or motor-driven, as shown schematically.

Figure 3:
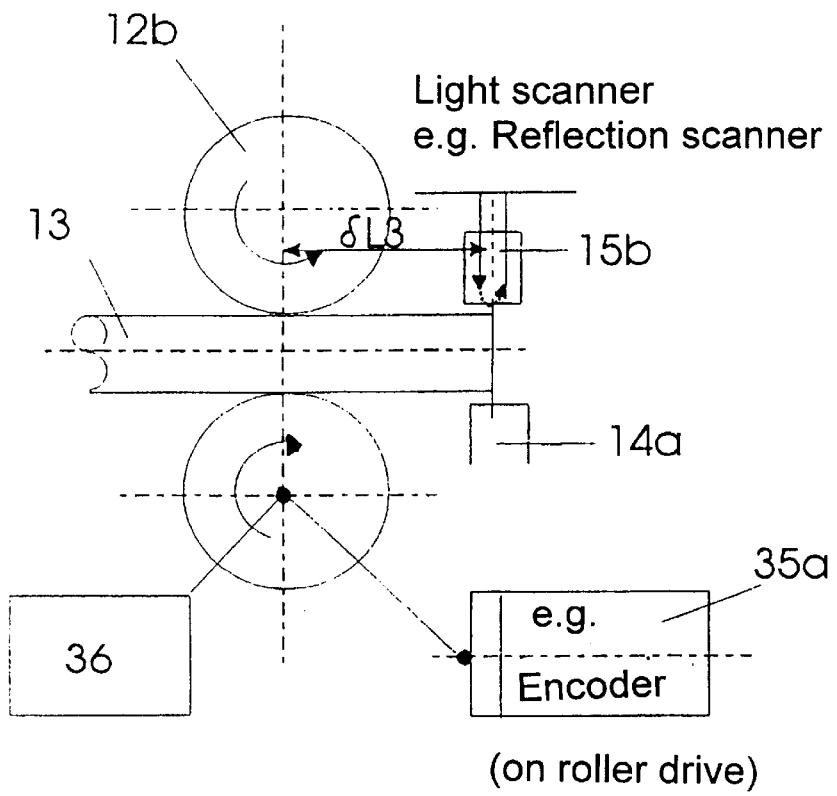
FIG. 3 shows a structure having two rollers acting as clamping device.

FIG. 3 shows a structure comprising two rollers 12b which act as a clamping device and can be positioned radially against the cable end section 13. These rollers 12b are connected to an encoder 35a which converts their rotary movement into a length over the cable end section 13 drawn through them. This length-measuring process is triggered, for example, by an optical reflection scanner, which is indicated schematically by 15b and 14a. Of course, the rigid distance δL3 between the axis of rotation of the rollers and the measuring line of the reflection scanner is known in the control, which is not shown here. Alternatively, the rollers 12b, which initially perform only a clamping and measuring function, can also be connected to a rotary drive 36 which inserts the cable end section in a controlled manner into the stripping device and optionally also pulls said end section out again, so that the actual feed process is no longer carried out manually but under motor control. In this invention, higher precision of insertion and optionally also a higher feed velocity than during manual introduction proves to be advantageous. Furthermore, such rollers may also cooperate directly in the stripping process by pulling the cable back toward closed knives so that the stripping process and the retraction process of the cable are combined. This is an inventive concept per se, for which independent protection is also desired. Such a stripping machine still differs substantially from stripping devices having a continuous cable feed and from integrated automatic cable processing machines. This novel concept also covers axially displaceable clamping jaws, over the feed distance of which the cable length is directly measured. Furthermore, this could also comprise external manipulators with their own drives.

Figure 4:
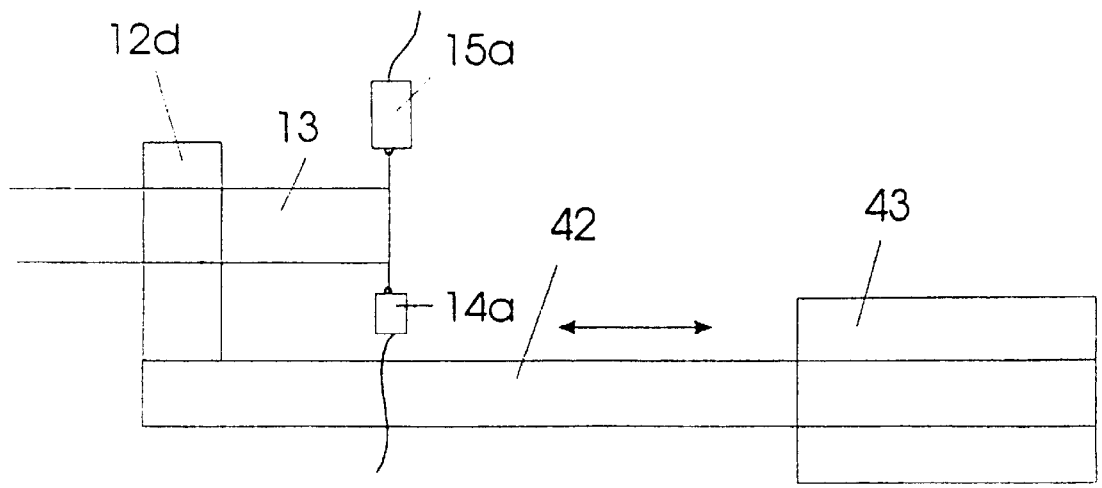
FIG. 4 shows a variant thereof having a measuring wheel.

A variant thereof is shown in FIG. 4, in which rotating clamping rollers 12b are replaced by clamping jaws 12d which are longitudinally displaceable on a feed rod 42 in a controlled manner by a feed drive 43. In this structure, the cable end section 13 is clamped by the clamping jaws 12d before the actual measuring process. This is effected in a region away from the length-measuring means and the cutting device. The feed drive 43 then moves the cable end section 13 in a controlled manner further in the insertion direction. Since this further displacement corresponds to the manual insertion process for a cable, this does not lead to any loss of time.

The feed drive operates with encoding, the start signal for the length measurement being triggered as a result of the end of the cable end section 13 passing through, for example, a light barrier (14a, 15a).

FIG. 8 shows, as a further example, a variant of a measuring device which dispenses with optical sensors and instead uses a measuring wheel 12c. In the present embodiment, the measuring wheel 12c has no clamping or transport function but serves merely for length measurement. In the embodiment shown schematically, the measuring wheel is spring-loaded by a pressure spring 44 in the radial cable direction. A ramp or sliding surface 45 is opposite the measuring wheel 12c, which is coupled to an encoder or the like 35b. Instead of the ramp 45, it would also be possible to provide a roller 12d, this preferably likewise being spring-loaded by means of spring 44b in the cable radial direction. An advantage of such a structure lies in the independence from the cable shape. Even highly curved cables can be readily measured. A further exemplary concept dispenses with an optical system: if, in the last-mentioned embodiment, a cable is inserted, this initially triggers the beginning of the measuring process as a result of measure wheel 12c and ramp 45 or roller 12d being spread apart. Since, in this embodiment, different cable diameters could lead to different length measurements, since thinner cables could trigger the measuring process closer to the vertical through the roller, it is also possible, in a special embodiment of this device, to measure the total height of the spread (δh) and to take this into account in the computation.

Figure 5:
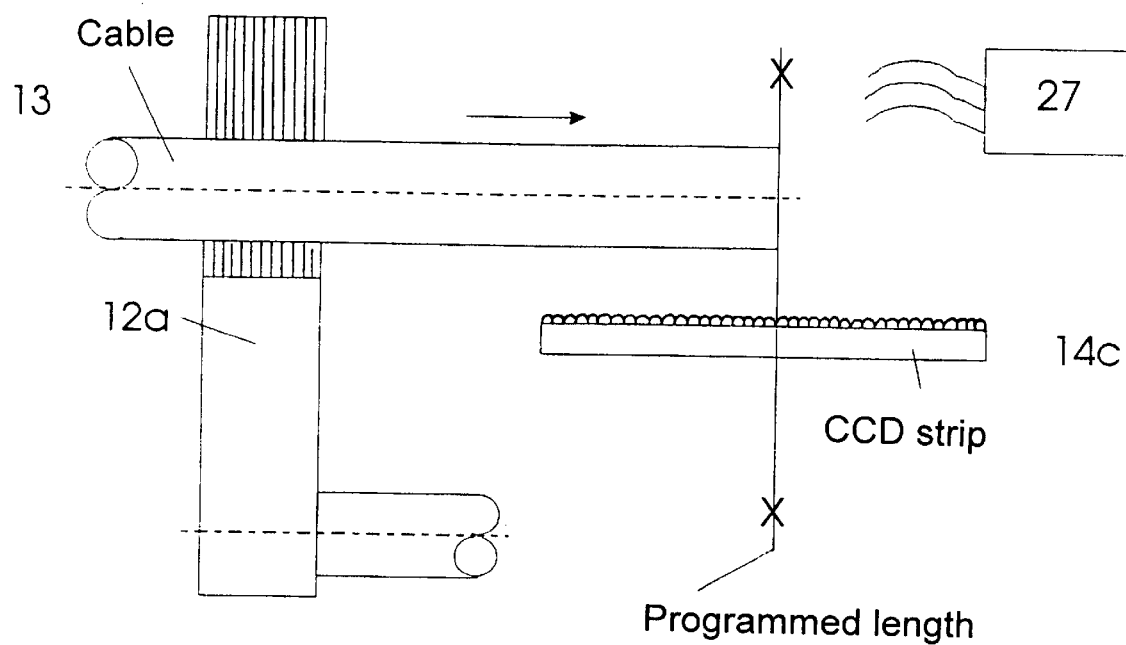
FIG. 5 shows a variant having rigid clamping jaws and a diode array for optical length scanning.

The embodiment according to FIG. 5 relates to a device having preferably axially rigid clamping jaws 12a. A diode array 14c (e.g. CCD) which directly scans the length of the inserted cable end section 13 with an appropriate choice of illumination (e.g. parallel beam path) is arranged behind these clamping jaws 12a. This structure is suitable in particular for straight cables. The control 27 can, if required, be chosen so that the clamping jaws 12a close after a programmed length has been reached. Incidentally, this process is as a rule also advantageous in the case of the other devices. Since this closing process may lead to inaccuracies, it is also possible, if required, to carry out a readjustment as soon as the length-measuring device, in the case of FIG. 5 the diode array 14c, detects that the programmed length has been exceeded or not reached. The adjustment can be reflected by appropriate consideration in the cutting knives or can be effected in a direct displacement of the cable with aid of an axial feed facility of the clamping jaws 12a.

Figure 6:
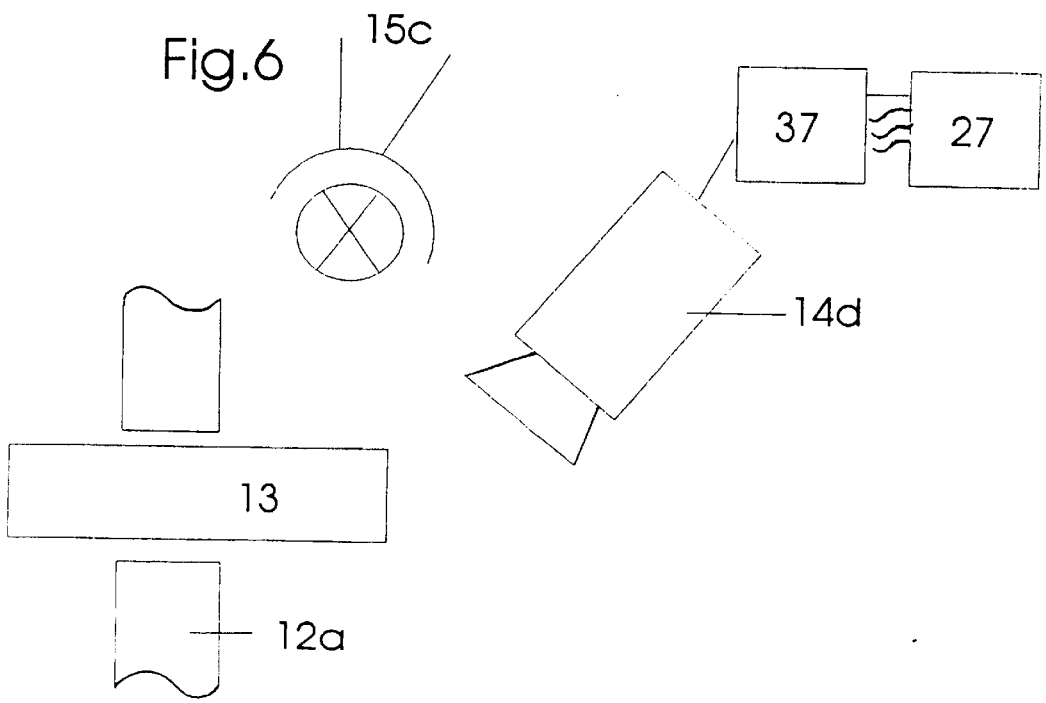
FIG. 6 shows a variant with length measurement by means of image processing.

In the device according to schematic FIG. 6, the length measurement is effected by image processing by means of image processing device 37 which is known per se and which is coupled to the control 27. By appropriate design of the image processing software, it is possible to determine the length also in the case of cables having any desired curvatures. In addition, this structure also has the advantage of providing a direct picture of the position of the cable and of the position of the tools in the region of the cable—for observation purposes or for documentation—in machine-processible form. Illumination 15c, which optionally also operates in the IR range, is also shown schematically. Of course, the present variant also comprises structures having a stereo camera for a three-dimensional measurement.

Figure 7:
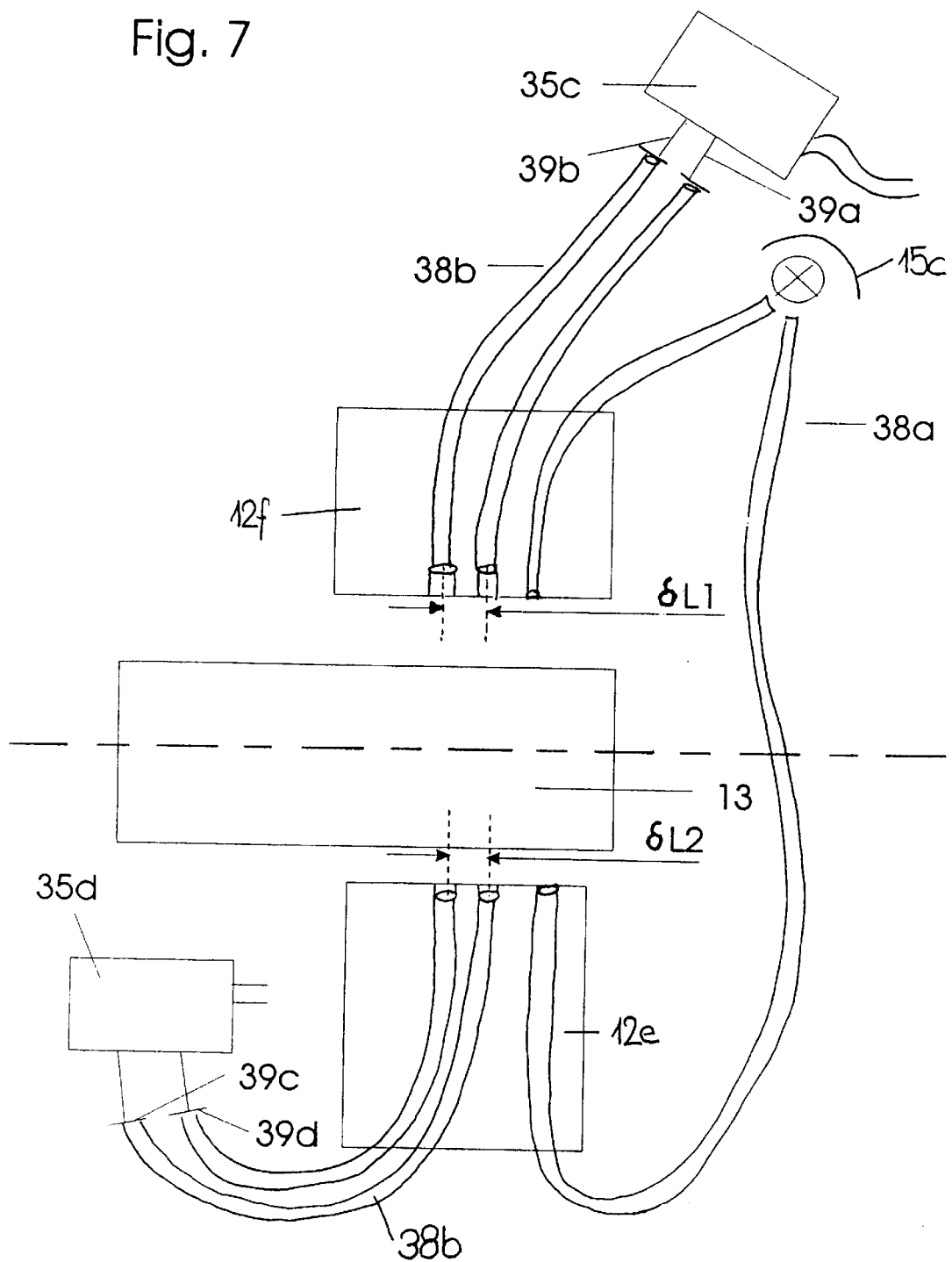
FIG. 7 shows a structure having fiberoptic cables integrated in clamping jaws and intended for optical surface scanning and signal transmission to optical length sensors.

FIG. 7 schematically indicates a clamping jaw arrangement 12e and f in which fiberoptic cables 38 are integrated, which on the one hand serve for any illumination (38a and 39a) but on the other hand also serve for receiving the length information.

A possible length-measuring method is explained by way of example in connection with FIGS. 7a–7d. This is a method which, for the length measurement, has comparative surface analyzers 35c, d—which measure optionally on length information printed on for measurement purposes or on the natural surface of the cable:

Surface analyzers 35c and 35d view the cable surface through the fiberoptic cables 38b at two points in succession along the axis. Those ends of the fiberoptic cables 38d which are on the cable side are a specific distance δL1 and δL2 apart. If a cable 13 is now inserted, the major change in the observation field results in a steep rise in the signal to signal receivers 39a–d, which are mounted on the fiberoptic cable ends on the sensor side. Such an exemplary signal curve is indicated in FIGS. 7a–7d. To detect the start of the length measurement, for example, the rapid rise in the signal at the sensor 39a according to FIG. 7b is chosen, which rise occurs after a rapid rise in the signal at the sensor 39b according to FIG. 7a. Owing to the naturally or artificially modulated surface of each cable (irregularities of the surface, markings, etc.), a signal modulated in the same manner is obtained on further insertion at sensor 39a, which signal has in each case already occurred at an earlier time at sensor 39b. The time offset is a measure of the feed velocity, which as a rule is of less interest. However, since the two sensors 39a and 39b are a distance δL1 apart owing to the spatial positioning of the fiberoptic cable ends on the cable side, the inserted length can be calculated from the fact of the signal repetition, by addition of a corresponding number of part-lengths of δL1. Since, owing to the thin design of fiberoptic cables, the is distance can be chosen to be very small, this method permits an accurate length measurement. The accuracy of this method of measurement can be improved if a second pair of sensors 39c and d is arranged in a staggered manner—in particular axially and around the circumference of the cable 13—and the length value determined more accurately between the results of the two sensor pairs 39*a, b* and 39*c, d* by calculating a correction. A light source 15*c* which is mounted in particular so that the surface structures on the cable 13 are particularly emphasized (e.g. shadow effect, special light color, etc.) is also indicated schematically.

Instead of this exemplary optical system, however, other methods known per se, such as, for example, capacitive or inductive measurements directly on the cable, are also within the scope of the invention.

A further independent concept of the invention comprises inscribing a cable with machine control information prior to stripping, for example before, during or after cutting to length, the stripping machine or the crosscutting machine being equipped with a sensor or with a read device, by means of which this control information is read and is introduced into the machine control so that the user no longer need program the stripping or crosscutting machine separately; the programming takes place to some extent automatically. Any codes, such as bar code, numerical code, line code, etc. are suitable as an inscription.

FIG. 9 shows a flow diagram comprising self-explanatory steps, the proximity of the steps indicating their simultaneity. Simultaneity in the context of the invention is merely preferred, or the individual steps may also overlap.

List of Reference Symbols 1,1*a* Fixed frame
2 Carriage
3 Guide rods
4 Stripping head, preferably rotatable
5 Head shaft
6 Wedge surface for knife lever
7 Wedge surface for centering jaw lever
8 Knife lever
9 Centering jaw lever
10 Stripping knife, cutting device
11 Centering jaw
12 Clamping jaw, clamping device; 12*b,d* Roller 12*e* Measuring wheel
13 Cable end section
14 Optical sensor, 14*a* Light barrier; 14*c* Diode array; 14*d* Image recording unit
15 Optical sensor; 15*a* Light barrier; 15*b* Light scanner; 15*c* Illumination
16 Pressure spring for centering jaw
17 Drive motor for control with encoder, stepping motor, potentiometer-controlled or the like
18 Threaded spindle for knife-centering jaw control
19 Motor for head rotation
20 Motor for axial feed with encoder, stepping motor, potentiometer-controlled or the like
21 Threaded spindle for carriage feed
22 Drive belt
23 Centering axis or axis of rotation
24 Arrow
25 Light beam
26 Input unit
27 Electronic control
35 Length-measuring device
35*a* Encoder on roller (drive)
35*b* Measuring wheel
35*c–d* Surface analyzers
36 Drive for roller
37 Image processing device; image evaluation unit
38 Fiberoptic cable
39 Signal receiver
40 Manipulator arm
41 Coupling
42 Feed rod
43 Feed drive
44 Pressure spring
45 Ramp or sliding surface

What is claimed is:

1. A stripping device comprising:
   at least one blade device (10),
   a cable length-measuring device connected to the blade device and
   a computer control for controlled incision of the blade device (10) into a cable,
   wherein the cable length-measuring device (35) comprises a noncontact cable length scanning device that measures cable length continuously during cable feed into the blade device.

2. Process for the length-defined stripping of a cable (13) in a stripping device with a clamp and at least one blade (10), comprising measuring
   a length of the cable (13) by length measuring device during an axial insertion of the cable behind an axial initial position of the clamp, and
   using a current measurement value of the length of the cable for control of the axial movement of the blade (10) relative to the clamp (12), and
   stripping the cable using the current measurement value of the length of the cable.

3. The method as claimed in claim 2, comprising carrying out the length measurement without cable contact.

4. The method as claimed in claim 2, comprising using detected attainment of a specific inserted length of the cable end section (13) to trigger closing of the clamp (12) and start of a stripping cycle.

5. The method as claimed in claim 2, wherein the cable end section (13) is moved axially to its final stripping position under motor control with the aid of displaceable clamping and/or centering jaws (12, 11).

6. The method as claimed in claim 2, comprising inserting the cable end section (13) by a manipulator arm (40) into the stripping device, the manipulator arm (40) performing a clamping function of the clamp, the length measurement on the cable end section (13) simultaneously defining its axial position relative to the manipulator arm (40) for further cable processing operations or cable processing stations.

7. Cable stripping device excluding endless cable processing devices, comprising
   a base,
   a cable clamp (12) on said base,
   a cutting device (10) on said base behind said cable clamp in a direction of cable insertion and
   a length-measuring device (14, 15, 35) on said base in front of said cable clamp in the direction of cable insertion,
   wherein the length-measuring device (14, 15; 35) comprises a continuous length measurement sensor that measures the length of a cable end section (13) of a cable, which was inserted behind an axial starting position of the clamp, during the insertion of the cable behind the cable clamp.

8. The device as claimed in claim 7, further comprising a fixed frame wherein the clamp comprises clamping jaws (12*a*) and is fixed rigidly, relative to the fixed frame (1), in the axial direction of the a cable end section (13).

9. The device as claimed in claim 7, wherein the clamp comprises at least one roller (12b) or one belt drive which is rotatable in the insertion direction of the cable and is connected to the length-measuring device (35a).

10. The device as claimed in claim 9, wherein the at least one roller (12b) is connected to at least one drive (36) for driven introduction or output of the cable end section (13).

11. Apparatus according to claim 7, wherein the length-measuring device comprises photo-optical transmitters or receivers (14, 15).

12. The device as claimed in claim 11, wherein the length-measuring device comprises a light scanner (15b).

13. The device as claimed in claim 11, wherein the length-measuring device comprises a diode array (14c), which is arranged behind the clamp (12), parallel to the cable end section (13) to be introduced.

14. The device as claimed in claim 11, further comprising a video imaging or recording unit (14d) coupled to an image evaluation unit (37) for determination of cable length by image analysis.

15. The device as claimed in claim 11, wherein the length-measuring device comprises fiberoptic cables (38) for illumination or scanning of length information.

16. The device as claimed in claim 11, wherein the length-measuring device comprises comparative surface analyzers (35c, d).

17. The device as claimed in claim 11, wherein optical transmitters or sensors are integrated in at least one of the clamping, centering or guide devices.

18. The device as claimed in claim 7, further comprising a plurality of length-measuring devices acting independently of one another, at least one of which operates without contacting the cable.

19. The device as claimed in claim 7, wherein the length-measuring device comprises a measuring wheel.

20. The device as claimed in claim 11, wherein the light scanner (15b) comprises a reflection scanner or a light barrier (14a, 15b).

21. The device as claimed in claim 16, wherein the comparative surface analyzers measure using length information printed for measurement purposes.

* * * * *